United States Patent [19]

Soloway et al.

[11] Patent Number: 4,493,161
[45] Date of Patent: Jan. 15, 1985

[54] TRAP FOR FLYING INSECTS

[76] Inventors: Richard Soloway, 1025 Seawane Dr., Hewlett Harbor, N.Y. 11557; Enzo Capalvo, 12 Hamilton Pl., Garden City, N.Y. 11530

[21] Appl. No.: 450,968
[22] Filed: Dec. 20, 1982
[51] Int. Cl.³ .......................... A01M 1/00; A01M 1/04
[52] U.S. Cl. ......................................... 43/107; 43/113; 43/122
[58] Field of Search ................. 43/110, 111, 107, 118, 43/122, 113, 2; D22/19

[56] References Cited

U.S. PATENT DOCUMENTS

| D. 211,339 | 6/1968 | Callahan | D22/19 |
| 580,163 | 4/1897 | Richter | 43/107 |
| 1,096,889 | 5/1914 | Boyd | 43/118 |
| 1,666,785 | 4/1928 | March | 43/122 |
| 2,237,897 | 4/1941 | Vos | 43/2 |
| 2,372,747 | 4/1945 | Sullivan | 43/121 |
| 3,494,067 | 2/1970 | Potrzuski | 43/110 |
| 4,244,135 | 1/1981 | Harwoods | 43/122 |

Primary Examiner—Nicholas P. Godici
Assistant Examiner—M. Jordan
Attorney, Agent, or Firm—James P. Malone

[57] ABSTRACT

A flying insect trap has a hollow body with a bottom portion. A plurality of legs are connected to said body and this body has an aperture in its bottom portion. A pair of transparent baffles are mounted inside the body and extend upwardly and converge to form a small opening. The top is transparent to let light in and attract the fly to the top where it is caught. The body is shaped and has a plurality of legs to resemble an animal whereby the body provides a visual lure.

4 Claims, 4 Drawing Figures

TRAP FOR FLYING INSECTS

TECHNICAL FIELD

This invention relates to traps for flying insects and more particularly to a trap shaped like an animal or a body with a plurality of legs to provide a visual lure and which does not require any bait.

BACKGROUND ART

The prior art is shown by the following patents, U.S. Pat. Nos. 1,858,087; 3,494,067; 3,820,273; 3,855,727 and 4,103,449.

Most of the prior art requires bait in the form of food and none of the prior art provides a trap in the form of an animal or a body with a plurality of legs to provide a visual lure.

THE INVENTION

The present invention provides a hollow body which is shaped to resemble an animal of any size. The bottom of the body is open and baffles are mounted inside the body which extend upwardly and converge to form a small opening, for instance, a slot. Insects are visually attracted to the trap and fly up between the baffles and get trapped inside the body. No bait in the form of food is required. Part of visual lure is the dark brown, black, dark orange or dark red color to resemble natural animal type colors.

Any body which is square, round or rectangular with a plurality of legs which visually attracts the biting type flies due to the fact that these type of flies depend on blood for reproductive and food purposes. These flies tend to bite the soft underside or belly area of the animal where the flies enter the trap and are then attracted to the light at the top of the trap where they are caught.

OBJECTS OF THE INVENTION

Accordingly, a principal object of the invention is to provide a new and improved trap for flying insects such as green headed flies.

Another object of the invention is to provide a new and improved trap for flying insects comprising, a hollow body having a bottom portion, a plurality of legs connected to said body, said body having an aperture in its bottom portion, and baffles mounted inside the body and extending upwardly and converging to form a small opening.

Another object of the invention is to provide a new and improved trap for flying insects comprising, a hollow body having a bottom portion, a plurality of legs connected to said body, said body having an aperture in its bottom portion, baffles mounted inside the body and extending upwardly and converging to form a small opening, wherein the body is shaped to resemble an animal or a body with a plurality of legs whereby the body provides a visual lure.

These and other objects of the invention will be apparent from the following specification and drawings.

BEST MODE OF THE INVENTION

Figure 1:
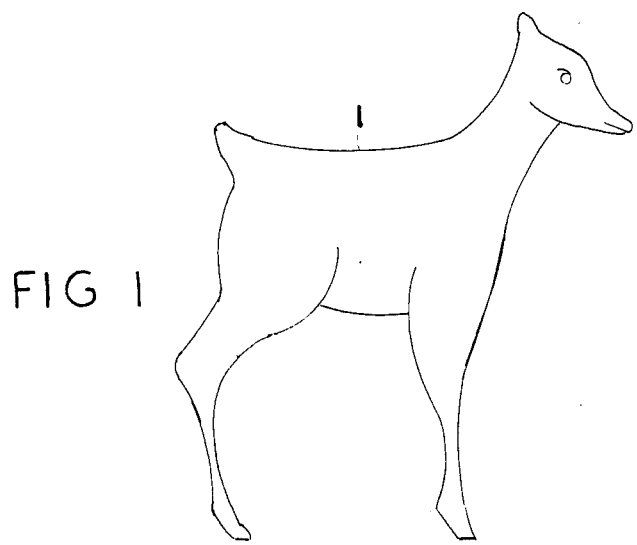
FIG. 1 is a side view of an embodiment of the invention.

Referring to the drawings, the flying insect trap of the present invention is formed to resemble an animal of any size, such as a Deer or even a Horse, or any body with a plurality of legs. In the embodiment shown, the trap is formed of two side pieces or or profiles 1 and 2, which are separated by separating members 3 and 4. Each of the profile members 1 and 2 is shaped to resemble an animal such as shown in FIG. 1 or any body with legs.

Figure 2:
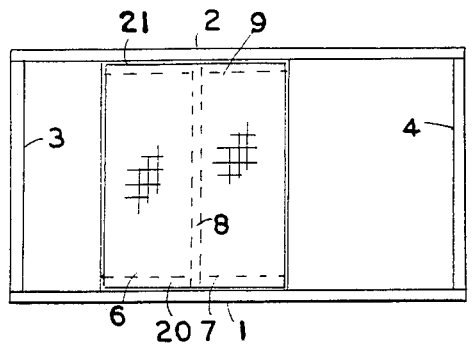
FIG. 2 is a top view of FIG. 1.
Figure 3:
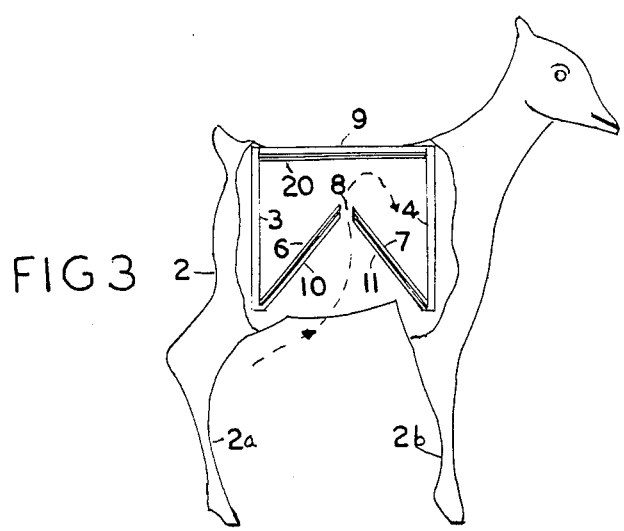
FIG. 3 is a side view of FIG. 2 with side cover removed partially.

FIG. 3 shows a side view of FIG. 2 with side 1 removed to show the interior. The member 2 has leg portions 2a, 2b. Member 1 is similar. The members 1 and 2 are separated by separating members 3 and 4. A pair of baffles 6 and 7 are mounted inside the hollow body member which is substantially completely open at the bottom. The baffle members extend upwardly and converge to form a slot 8. Flying insects such as green head flies are attracted by the visual lure of the animal shape and fly upwardly through the open bottom and through the slot 8 and are trapped. The baffles are mounted on rails, 10, 11, etc., with clips so that the baffles can be slid or snapped into place and inserted or removed for assembly or cleaning. The top is also mounted on rails 20, 21, with clips so that it can be slid or snapped into place and inserted or removed for assembly or cleaning. The baffles are transparent to transmit light which will enter through the transparent top 9, of the body and the baffles and top 9 may be made of ordinary insect screening or they may be transparent plastic.

Figure 4:
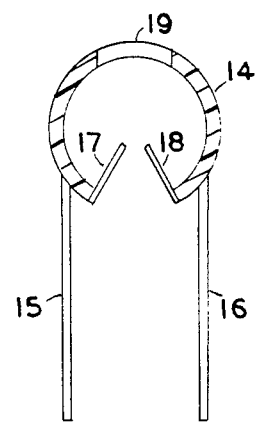
FIG. 4 is an end view of a modification of the invention wherein the body is formed of one piece, partly in section.

FIG. 4 shows a modification of the invent having a body member 14 which is formed of one piece and which may be made of plastic or other equivalent material. The body member is mounted on legs 15 and 16 and has baffles 17 and 18, similar to those previously described. The body in FIG. 4 may be formed by the technique of blow molding. The top 19 of the body 14 may be a screen or transparent plastic.

The dotted line in FIG. 3 shows the path of the insect which flies up between the baffles and is trapped. The baffles can be inserted or removed periodically for assembly or cleaning. No food bait is required since the invention provides a visual lure.

It is claimed:

1. A flying insect trap comprising:
   a hollow body having a bottom portion,
   a plurality of legs connected to said body, said body having an aperture in its bottom portion,
   a plurality of baffles mounted inside the body and extending upwardly and converging to form a small opening,
   the body being shaped and colored to resemble the body of an animal whereby the body provides a means for visually luring the insect to the trap,
   the baffles being screens to let light shine through to attract flying insects towards the top.

2. Apparatus as in claim 1 wherein the baffles are clear plastic to let light shine through to attract fly towards the top.

3. Apparatus as in claim 2 wherein the baffles are inserted or removable for assembly or cleaning.

4. Apparatus as in claim 2 wherein the body is colored to resemble natural animal colors.

* * * * *